United States Patent

[11] 3,583,710

| [72] | Inventor | Pierre R. Burelle<br>Paris, France |
|---|---|---|
| [21] | Appl. No. | 761,197 |
| [22] | Filed | Sept. 20, 1968 |
| [45] | Patented | June 8, 1971 |
| [73] | Assignee | Societe anonyme dite: Plastic Omnium<br>Lyon, France |
| [32] | Priority | Apr. 5, 1965, Jan. 12, 1966, Sept. 21, 1967, |
| [33] | | France |
| [31] | | 11,954, 45,576 and 121,792<br>Continuation-in-part of application Ser. No. 539,206, Mar. 31, 1966, now abandoned. |

[54] JOINT FOR PLASTIC TUBES
2 Claims, 8 Drawing Figs.

[52] U.S. Cl............................................................ 277/101,
277/187, 277/207, 285/111, 285/137
[51] Int. Cl............................................................ F16j 15/00,
F16l 21/02
[50] Field of Search.......................................... 277/101,
187, 207 A, 208; 285/110, 111, 137, 137 A

[56] References Cited
UNITED STATES PATENTS

| 1,894,711 | 1/1933 | Schacht............................ | 277/205X |
| 2,157,867 | 5/1939 | Robertson et al.............. | 277/187X |
| 2,956,822 | 10/1960 | Kates................................ | 285/137A |

FOREIGN PATENTS

| 1,361,209 | 4/1964 | France............................ | 285/110 |
| 671,880 | 10/1964 | Italy................................. | 285/111 |

Primary Examiner—Samuel B. Rothberg
Attorney—Holcombe, Wetherill and Brisebois

ABSTRACT: Joint for connecting plastic tubes of differing diameter comprising a ring which is a snap fit onto the end of the larger tube and a sealing member adapted to be held between said end and ring. The sealing ring has a depending outer skirt which engages the inner wall of the larger tube and an inner skirt which bears against the outer wall of the smaller tube. The inner skirt is frustoconical when unstressed, and the ring comprises a transverse rim which prevents the sealing ring from being forced off the end of the smaller tube by pressure within said tube.

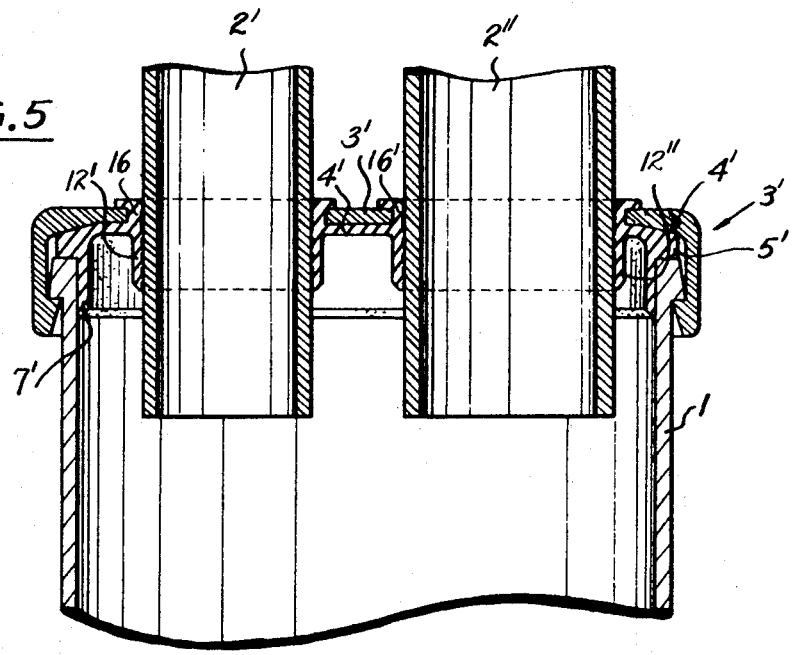
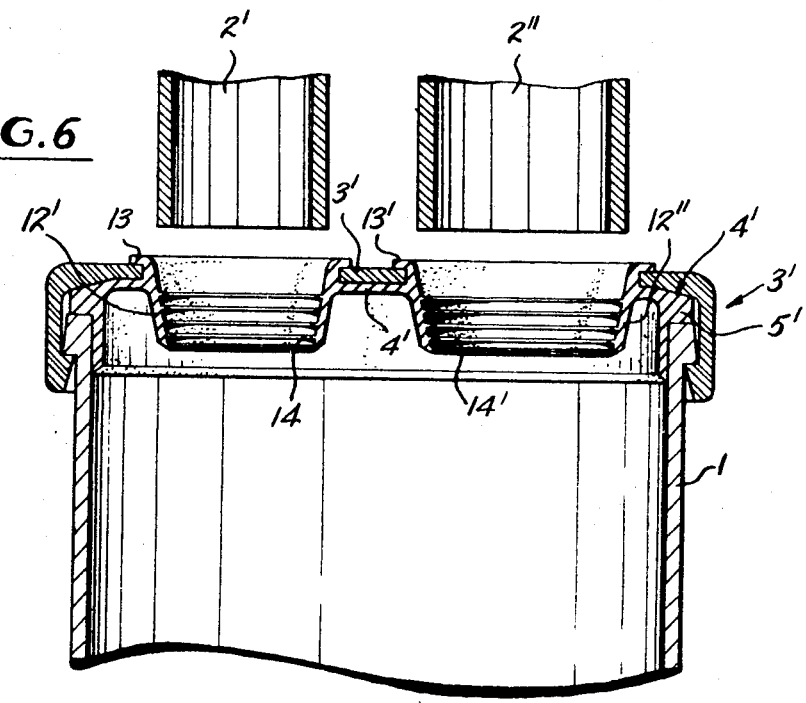

JOINT FOR PLASTIC TUBES

This application is a continuation-in-part of my prior application Ser. No. 539,206, filed Mar. 31, 1966, now abandoned.

This invention relates to a leakproof pipe joint especially adapted to assemble sections of plastic pipe.

The joint according to the invention is capable of acting as an expansion joint by accommodating the relative movement between interconnected sections which results from temperature fluctuations.

The device according to this invention provides an unusually simple and economical way of interconnecting duct sections of different diameter, since it offers a very convenient way of solving the problem of the increasing cross section to be imparted to a pipe as the branches leading off it gradually increase in number.

The device according to the present invention permits ready dismantling of the pipes or ducts for cleaning, for reutilization elsewhere, or for any other purpose. Finally, it has the advantage of retaining all its advantageous properties notably that of being leakproof, even if the axes of the various sections assembled together are not mutually aligned, thereby greatly facilitating assembly.

The present invention is characterized by the fact that it comprises a cylindrical male member and a female member equipped at its end with an annular seal made of natural or synthetic rubber or other resilient material and formed with two skirts which bear against the interior of the female member and the exterior of the male member respectively, said annular seal being fastened to the end of the female member by means of a flange which is secured in position by a ring retained on the end of the female member and embodying a substantially flat upper portion formed with an opening having a diameter slightly greater than the outer diameter of the male member.

In one embodiment of the invention, the ring for securing the seal snaps onto the end of the female member and clamps the heel of the annular seal between its bottom and the end of the female member.

In an alternative embodiment, the leakproof seal has formed on its inner periphery a skirt preferably located level with said heel. This skirt helps to ensure adequate sealing by bearing elastically against the outer wall of the male member.

In a preferred embodiment of the invention, the inner skirt has a set of small ribs on the surface which bears against the male member. These ribs are substantially semicircular in cross section.

In accordance with another feature of the invention, each female member can be equipped with several different rings which differ from one another only by the diameters of their central openings so as to match the diameters of a plurality of different male members which may be connected to said female member.

It goes without saying that in each case the dimensions of the seal attached to the end of the female member are such that its inner skirt is pressed against the associated male member whereby to ensure satisfactory sealing.

In one specific embodiment of the invention, the rim of the female member is formed with a circular ridgelike flange and the inner periphery of the ring with a number of uniformly spaced associated ridges over which the flange may be snapped.

In another specific embodiment of the invention the ring member and seal may be pierced by a plurality of holes, each adapted to receive a male member, so that a plurality of male members may be connected to a single female member.

Several illustrative embodiments will now be described with reference to the accompanying drawings, in which:

FIG. 3a is a partial cross-sectional view, on an enlarged scale, through the seal used in FIG. 3, FIG. 5 is a sectional view through an embodiment in which two male members are connected to a single female member;

FIG. 6 shows the embodiment of FIG. 5, before the male and female members have been brought together.

FIG. 1 shows the end of the female member 1 to which a cylindrical male member 2 is to be attached.

Figure 1:
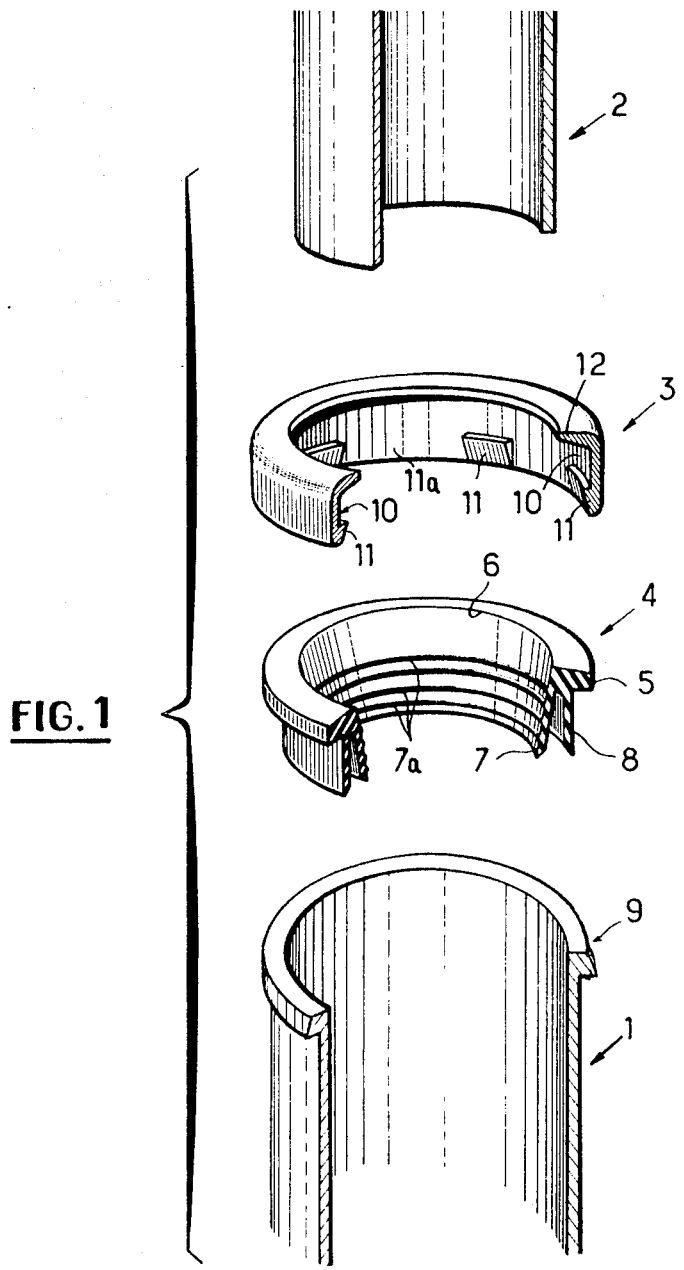
FIG. 1 is an exploded sectional view in perspective of a first embodiment of the invention.

The drawings also show a ring 3 which is used in accordance with the invention for securing a seal 4 to the end of the female member.

Seal 4 is formed with a peripheral flange 5 enabling it to be retained on the end of the female element. It is also formed with two skirts 7 and 8, with skirt 7 extending angularly inward from the inner edge 6 of the flange 5. The skirt 8 has a substantially cylindrical periphery, the diameter of which matches the inner diameter of the end of the female member 1.

As clearly shown in FIG. 1, the inner surface of skirt 7 is provided with ribs 7a of substantially semicircular cross section.

The top of the female member 1 is formed with a circular ridgelike flange 9 adapted to engage in a groove 10 of matching shape formed in ring 3, uniformly spaced projections 11 being formed on the inner periphery of ring 3 to engage over flange 9 upon assembly.

FIG. 1 shows the manner in which the projections 11 are separated by intervening recessed portions 11a, whereby the elasticity of ring 3 and its positive engagement over the end of the female element are facilitated.

Also shown in FIG. 1 is a flat upper portion 12 formed on ring 3 and having a central opening therein the diameter of which is only slightly greater than the outer diameter of male member 2.

In order to assemble together the various parts hereinbefore described, the seal 4 is first positioned on the end of female element 1, following which the ring 3 is pressed down on the seal 4 with sufficient force to cause the projections 11 to snap into position behind the flange 9, thereby rigidly uniting the ring and female member together with seal 4 retained in position by its flange 5.

It is to be noted that the flexibility of the seal in conjunction with the slight outward taper of flange 5 enables seal 4 to be replaced without removing the ring 3.

To complete the joint according to this invention, male element 2 is then inserted so that its surface bears against the skirt 7 and the ribs 7a formed thereon, care being exercised to ensure that the male element is inserted far enough to allow for lengthwise variations due to expansion.

Figure 3:
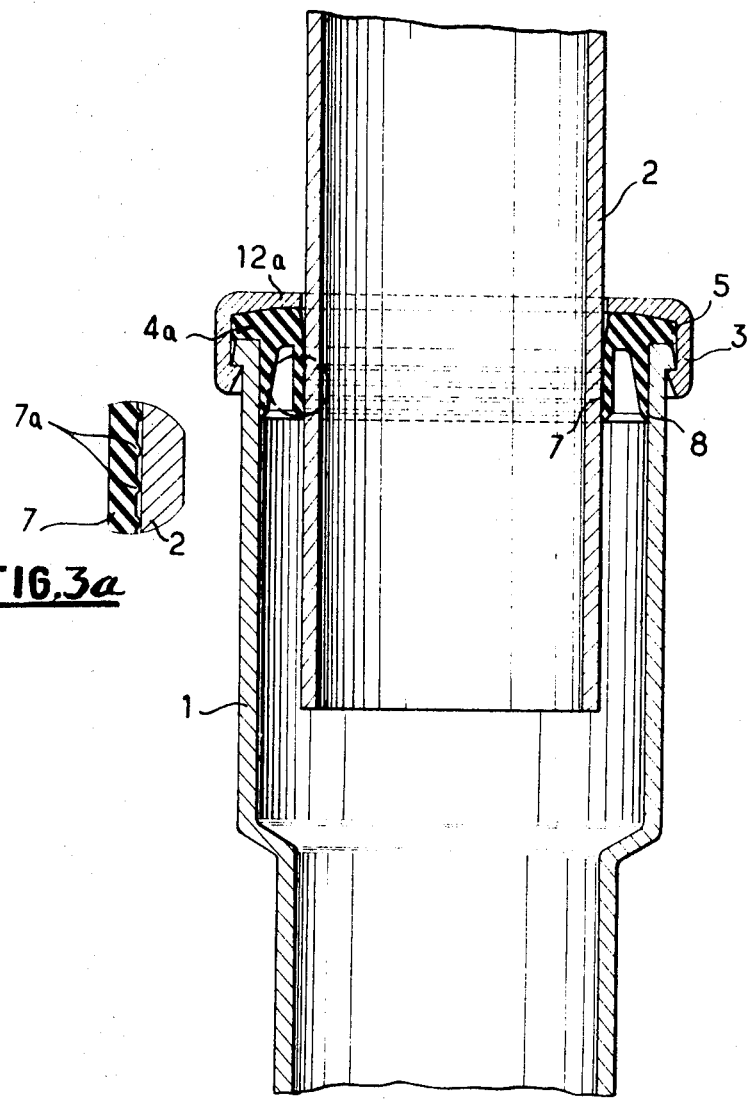
FIGS. 3 and 4 show how male members of different diameter may be connected to a given female member, in accordance with the invention.
Figure 4:
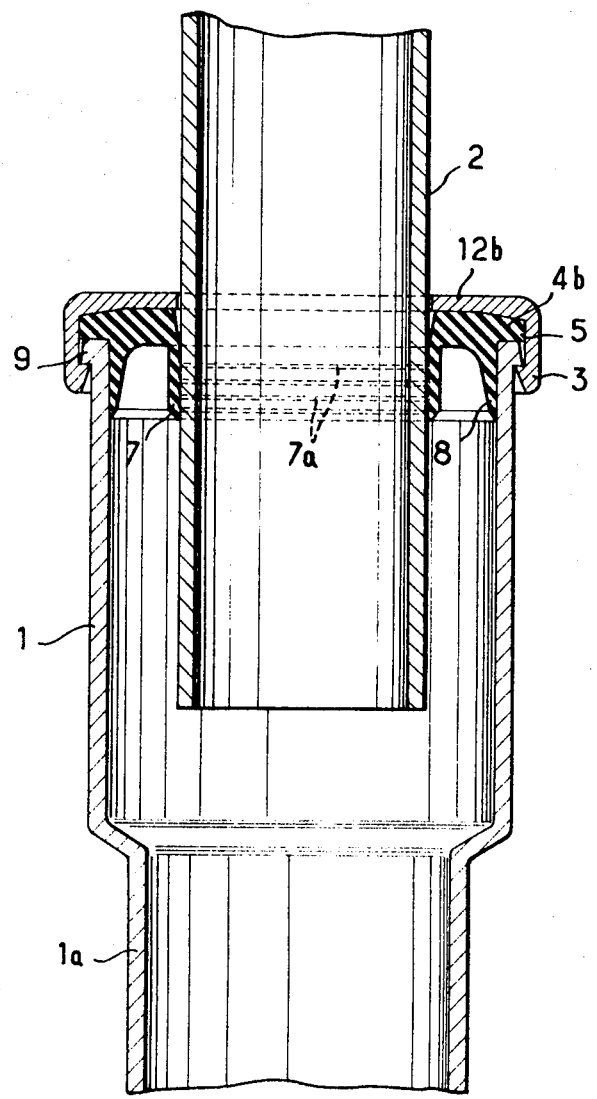

Turning now to FIGS. 3 and 4, these figures show how the joint according to the invention can be used to obtain reductions in cross section in a duct. In this embodiment, the various component parts retain their essential respective characteristics hereinbefore described.

Figure 2:
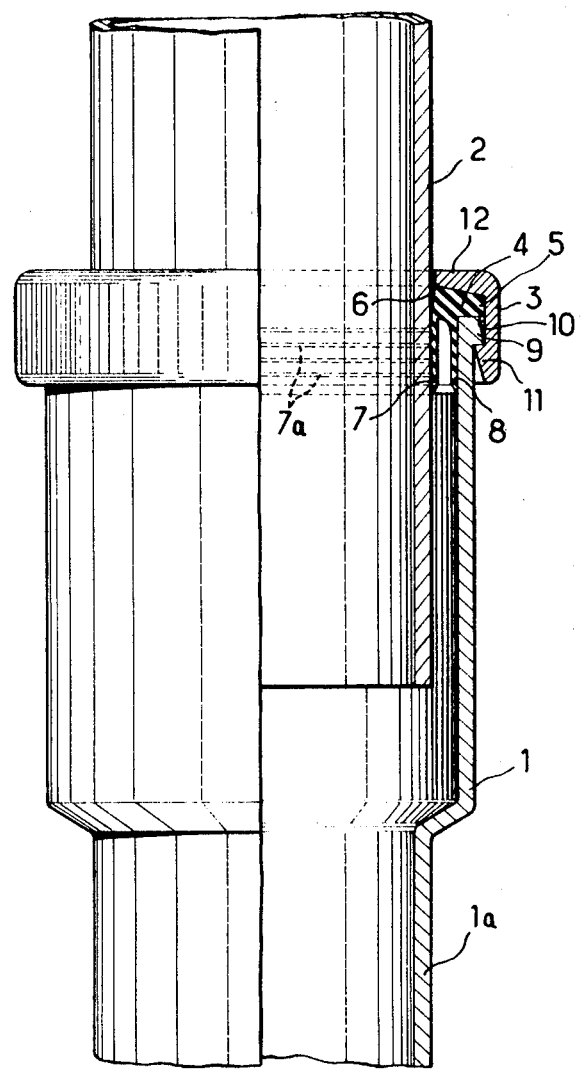
FIG. 2 shows in partial section the device of FIG. 1, subsequent to assembly thereof.

The assemblies shown in FIGS. 3 and 4 differ from that of FIG. 2, firstly in that the diameters of the male element and the openings formed in the upper portions 12a, 12b of ring 3 are both different and, secondly in that the seal 4a, 4b differs in thickness so as to allow for the difference in diameter between the male element and the female element.

Figure 7:
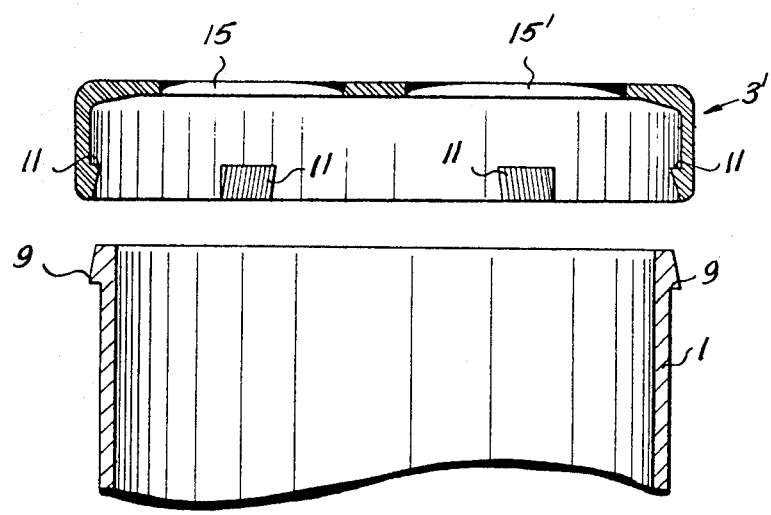
FIG. 7 is an axial section showing only the ring and female member of FIG. 5.

Turning now to FIGS. 5—7, it will be seen that in this embodiment the ring 3 of FIGS. 1—4 is replaced by a ring 3', the upper part 12' of which is provided with two holes, 15, 15'.

The sealing member 4 is replaced by a resilient member 4', provided with a peripheral flange 5' an outer skirt 7' depending from this flange, and two inner skirts 12', 12'', positioned to lie beneath and register with the two holes 15, 15', when the annular projections 16, 16' which extend upwardly from these skirts are seated in these holes, with the lips 13, 13' overlapping the tops of the holes. These lips are sufficiently flexible to permit them to be forced through holes 15, 15'. The skirts 12, 12' may be provided with internal ribs 14 to provide a better seal against the male members to be inserted therein, and are frustoconical in shape so as to accommodate male members which differ in diameter or degree of roundness. The ring may be provided with more than two holes, with the sealing member correspondingly adapted to conform thereto.

It will be seen that in accordance with the invention, it is possible to interconnect piping of different diameters in extremely simple fashion. To that end, all that is necessary is to provide a range of rings 3 which differ from one another solely with respect to the diameter of the opening formed in the surface 12. It is, in fact, extremely simple to manufacture such different rings, since they can be made in the same mold.

It will then suffice, in order to interconnect a female member with male members of different diameters, to modify the section of the leakproof seal while at the same time preserving its other characteristics.

The subject joint according to this invention has the advantage of being extremely easy to use, for once the seal has been mounted on the end of the female member by means of the snap-on ring, all that is necessary is to inset the male member into the seal.

In addition, it is very easy to accommodate cross-sectional changes in the pipe by utilizing different sizes of rings, as hereinbefore indicated.

A joint according to this invention is absolutely fluidtight with respect not only to nonpressurized liquids flowing therethrough (such as waste water or rainwater), but also of pressurized liquids, such as steam and the like. The device is also odorproof.

Tests conducted by the Applicant have shown that the joint according to this invention is leakproof up to the maximum permissible pressures which may be used in practice for plastic piping.

Manifestly, many changes may be made in the specific embodiments hereinbefore described, in order to adapt them to specific operational requirements.

For example, such joints may be used to unite two pipe sections or to join a pipe section to such components as elbow sections, bypass sections and the like.

It goes without saying that the device according to the invention may also be used to interconnect a plurality of elbow sections or the like.

I claim:

1. A device for mechanically fastening together at least one cylindrical male member and a cylindrical female member provided with a terminal portion having an inner diameter larger than the external diameter of said male member, said device comprising an outer ring dimensioned to encircle the edge of said terminal portion, said outer ring being provided with an inwardly extending flange defining at least one orifice, the number of such orifices being the same as the number of said cylindrical male members and each of said orifices encircling a different one of said male members, said cylindrical female member comprising an external circular rib and said outer ring comprising a plurality of hooks distributed about the inner circumference of said outer ring and adapted to catch over said rib, a sealing ring of elastic material having a flange positioned between said edge of said terminal portion and said flange on said outer ring, said sealing ring having at least one opening therein, each of said openings being located in alignment with a different one of said first orifices and closely encircling a male member, and at least one inner skirt, each of said inner skirts encircling a different one of the openings in said sealing ring, each of said inner skirts depending from said sealing ring and being, when unstressed, frustoconical in shape, tapering inwardly toward its free edge, but dimensioned to be pressed flat against the outer surface of a male member inserted in the opening in said sealing ring encircled thereby, said sealing ring comprising an outer skirt in sealing contact with the inner surface of said female member, the flange on said outer ring projecting radially inward past the inner surface of said terminal portion so as to provide support for the portion of said sealing ring carrying said skirts against pressure exerted thereon from within said cylindrical members.

2. A device as claimed in claim 1 in which said sealing ring carries at least one annular projection, each of said annular projections being aligned with and extending away from one of said inner skirts and fitting into a different one of said orifices in said outer ring, each annular projection being provided with a lip which laps over the edge of the orifice into which that projection fits.